United States Patent [19]

Perkins et al.

[11] 3,720,932

[45] March 13, 1973

[54] MAGNETIC RECORDING ARRANGEMENT UTILIZING A GAS FILM BEARING

[76] Inventors: Robert L. Perkins, 680 Arcadia Drive, St. Paul, Minn. 55118; Beat G. Keel, Route 1, Prior Lake, Minn. 53021

[22] Filed: Feb. 13, 1967

[21] Appl. No.: 615,825

[52] U.S. Cl. ........................340/174.1 E, 179/100.2 P

[51] Int. Cl. ..............................................G11b 5/60

[58] Field of Search...........340/174.1 E; 179/100.2 P

[56] References Cited

UNITED STATES PATENTS

| | | | |
|---|---|---|---|
| 3,187,112 | 6/1965 | Smith, Jr. | 179/100.2 P |
| 3,480,936 | 11/1969 | Gerlach et al. | 340/174.1 E |
| 2,957,051 | 10/1960 | Epstein | 340/174.1 |
| 2,961,494 | 11/1960 | Darou | 340/174.1 |
| 2,972,738 | 2/1961 | Sliter | 179/100.2 |
| 3,149,337 | 9/1964 | Sliter | 340/174.1 |
| 3,243,790 | 3/1966 | Powers | 179/100.2 |
| 3,245,063 | 4/1966 | Cheney | 179/100.2 |

*Primary Examiner*—J. Russell Goudeau
*Attorney*—Cushman, Darby & Cushman

[57] ABSTRACT

The present disclosure relates to a magnetic recording arrangement utilizing a head assembly which during operation bears on a thin film of gas, such as air, in spaced relationship from a magnetic recording medium. The head itself is positioned at the end of a cantilevered spring arrangement to achieve a very small clearance between the head and the record surface.

6 Claims, 2 Drawing Figures

Figure 1:
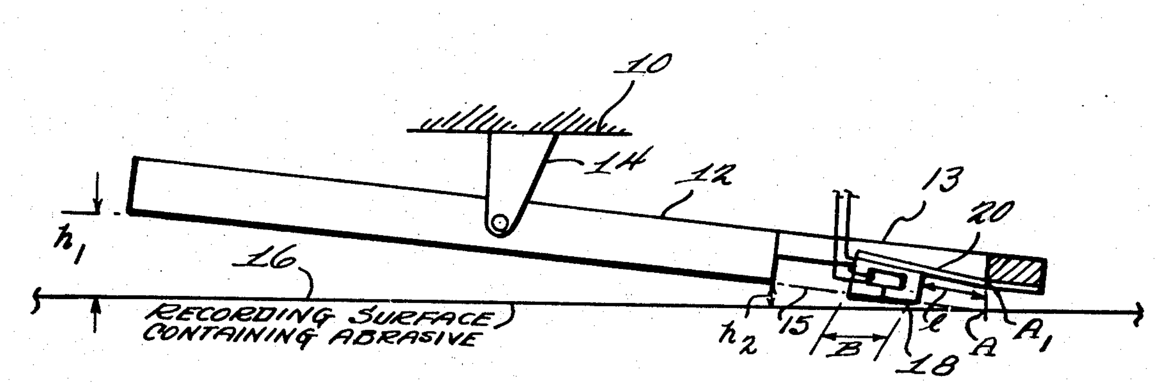

INVENTORS
ROBERT L. PERKINS
BEAT G. KEEL

BY
Cushman, Darby & Cushman
ATTORNEYS

MAGNETIC RECORDING ARRANGEMENT UTILIZING A GAS FILM BEARING

In the field of magnetic recording, there has evolved the application of a long-known principle of utilizing a gas, such as air, as a lubricating film in the form of a load-supporting wedge between a recording surface and a magnetic head when there is relative motion between the two. This film is intended to prevent the head from rubbing against the recording surface thereby damaging the latter and adversely affecting the recording and reading of information.

In an attempt to insure proper alignment between the head structure and the recording surface, prior art arrangements have incorporated the head in a pivoted slider bearing pad so that as the recording medium and the head move relative to one another, the pivot permits the slider pad to align itself with the record. However, such a manner of supporting the head suffers a limitation with respect to the minimum distance the head may be maintained from the recording surface in order for the gas film to support the head assembly. The separation distance is in the order of 250 microinches for bearing pads having flat surfaces. It is obvious that if the head could be moved closer to the recording medium, the quality of reading information from the record, or recording information thereon, would necessarily improve, and it would therefore be possible to increase the density of the information stored on the record by allotting a smaller portion of the recording surface to each information element. Attempts to achieve these desirable characteristics have taken the form of changing the surface configuration of the pad so that it is curved rather than flat. This has resulted in the clearance being reduced, but only to the magnitude of 100–150 microinches. These prior art arrangements are discussed in detail in the 1962 publication entitled "Gas Film Lubrication," by W. A. Gross.

The present invention is directed to a magnetic recording arrangement including a novel head assembly which is capable of being sustained by a gas film at a distance in the order of 25 microinches from the recording medium, thereby permitting very high recording density.

The invention also involves an improved recording surface having intentionally introduced abrasive properties to condition the head assembly for support by a thin gas film and to maintain the head surface clean and in alignment with the recording medium.

Briefly, the invention includes a magnetic head assembly having a first conventional slider bearing pad which is pivotally mounted on supporting structure such that during relative movement between the pad and the recording surface, the pad is separated from the record by a substantial distance, e.g., 500 microinches. The first slider pad serves as a stable platform for a cantilevered spring arrangement, to the free end of which spring a second and smaller slider pad is attached. The magnetic head is incorporated in the second pad. The magnetic oxide surface of the recording medium includes an abrasive capable of removing material from the second slider pad's surface when the latter rubs against the record. The cantilevered spring has a spring rate and initial deflection designed to urge the pad and its head toward the record, but these forces are of insufficient magnitude to permit the head to be worn through by the abrasive to a point when head core gap is destroyed. This results in the second slider pad being lapped to a "flying" condition when the second slider bearing pad surface is worn to become parallel to the adjacent record medium and when the load force exerted by the spring and second slider pad become supportable as a gas bearing, which occurs at a near-zero gas film thickness.

The details and scope of the invention will become more fully apparent when considered in light of the following description of an illustrative embodiment of the invention and from the appended claims.

Figure 2:
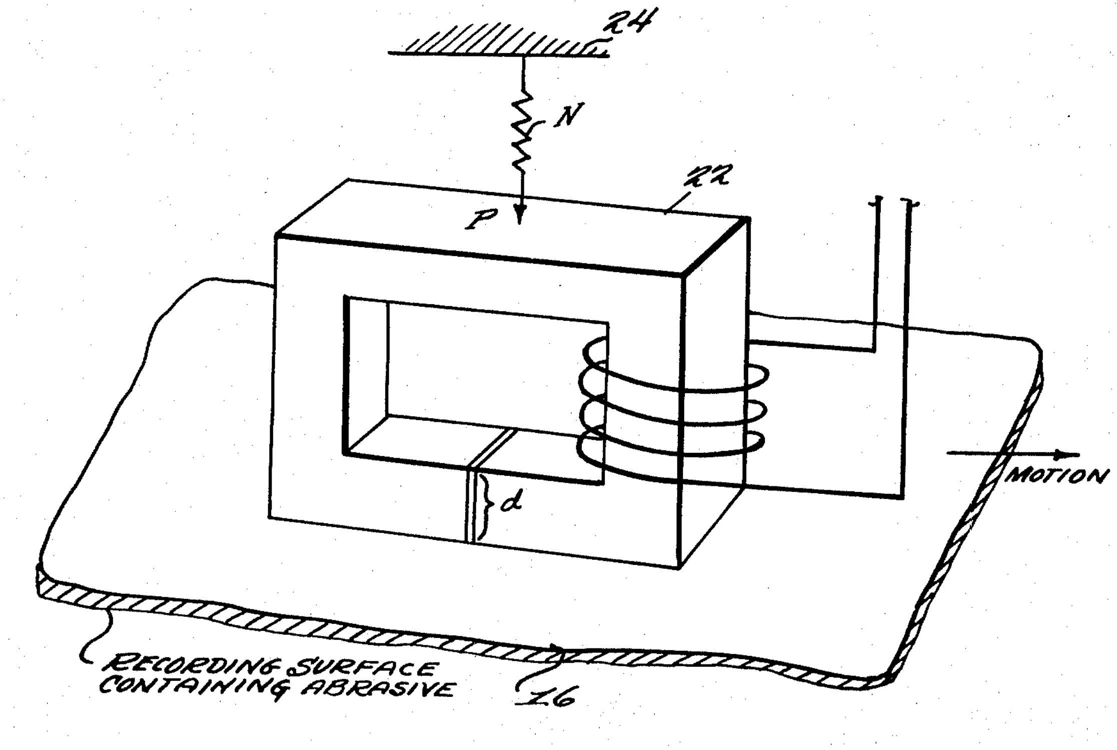

The illustrative embodiment may be best understood by reference to accompanying drawings, wherein:

FIG. 1 is a schematic diagram illustrating the several elements of the compound air bearing magnetic head assembly; and FIG. 2 is a schematic diagram illustrating the several parameters involved in insuring a parallel relationship of the slider pad surface and that of the recording medium at zero film thickness.

Referring to FIG. 1, there is illustrated first and second bearing members which are moved relative to one another. The first bearing member includes a support element, generally denoted by the numeral 10, which in an actual construction could be a transducer-carrying arm. A first slider bearing pad 12 is pivotally connected to support 10 by conventional means indicated at 14. The purpose of the pivotal mounting is to overcome the problem of providing exact alignment between the slider bearing pad and the second bearing member, the record. Slider bearing pad 12 is positioned so as to have a relatively large clearance from the surface of a recording medium 16 during operation. The distance is in the order of 500 microinches at the trailing edge of pad 12. This relatively large clearance permits reasonable variations in the relative flatness of the record and results in a gas film which behaves as if the film were incompressible. With the bearing pad 12 supported on a pivot, the center of pressure supporting the bearing is located at the pivot line. If any change occurs which tends to move the center of pressure off the pivot line, a moment will be developed which will change the angle or slope of the slider bearing pad 12. This change of slope will move the center of pressure back to the pivot line and the system will return to a balanced state. A characteristic of the pivoted slider bearing pad 12, when operating with an incompressible film, is that the bearing pad will have a constant film thickness ratio. This characteristic has been described in detail in the literature hereinbefore identified at page 4, lines 3–5. However, as applied to the present invention, the film thickness ratio is defined as the ratio of the recording medium clearance $h_1$ at the leading edge of bearing pad 12 to the recording medium clearance $h_2$ at the trailing edge of bearing pad 12. From FIG. 1 it can be seen that, if the ratio $h_1/h_2$ remains constant, a line 15 can be drawn extending from the plane of the lower surface of bearing pad 12 to intersect the recording surface at point A. This point A is a fixed distance from the trailing edge of bearing pad 12 and remains constant over the range of different bearing pad slopes for which the incompressible film assumption holds true. Thus, it will be appreciated that, relative to Point A, the slider bearing pad 12 presents a stable platform flying so as to maintain Point A as a fixed reference point located on the recording surface a fixed distance from the trailing edge of the bearing pad 12.

The existence of fixed reference point A provides a convenient point from which to construct a recording head capable of extremely close and non-varying clearances from the recording surface. A second and smaller slider bearing pad 18 having a breadth B is mounted on the free end of a cantilevered spring 20 which is fixed at its opposite end to extension 13 of bearing pad 12. The cantilever spring is optimally connected to extension 13 at point $A_1$, which is directly above reference point A on the recording surface 16. Because mounting point $A_1$ is directly above fixed reference point A, slider bearing pad 18 is almost independent of any small clearance variations of bearing pad 12 from the recording surface.

Spring 20 is oriented so that the motion of the recording medium 16 is in a direction from the free end thereof toward its supported end. As to the optimum manner for fixing the bearing pad 18 along spring 20, no absolute rule can be given. However, it has been found that a film thickness ratio of 2 is appropriate to good gas bearing practice. Using this ratio and having knowledge of the conventional cantilever beam deflection formulas, it can be mathematically developed that the slider bearing pad 18 can be properly mounted at a distance *l* from the fixed end of spring 20 which is 1 ½ times the breadth B of the pad. These dimensions are shown in FIG. 1.

A pivoted arrangement for the second slider bearing pad 18 has been eliminated in favor of mounting on a cantilevered spring due to the fact that it is the object of the invention to have pad 18 in very close proximity to record surface 16. If pad 18 were pivotally mounted, the film thickness ratio would approach unity as the pad approached the recording surface and the supporting film wedge would be lost with the pad and recording surfaces still separated. This would cause the supporting film to collapse and the slider pad to crash into the recording surface.

The cantilevered spring 20 permits the film thickness ratio to remain constant independently of the clearance between bearing pad 18 and record 16. The surface of pad 18 becomes parallel with the surface of the recording medium only at zero film thickness. The manner of achieving absolute parallelism at zero film thickness will now be described.

So as to avoid excessive precision in the recording surface, the second slider bearing pad 18 is fabricated with a very small slider bearing area. In such an arrangement the face of the magnetic head core comprises a substantial portion, if not all, of the bearing area. A typical core might, for example, have a breadth in the order of 50 mils. The manufacture of such small elements, which are intended to be separated from the recording medium by only 25 microinches, is subject to inaccuracies which, although relatively small, are critical to the gas film bearing performance of the pad.

To provide a type of self-adjusting feature for systems using such small slider bearing pads, the magnetic oxide surface of the recording medium includes an abrasive ingredient. The purpose of the abrasive is to provide a capability for the magnetic coating to cut, or wear away, the surface of the bearing pad 18. In the embodiment shown in FIG. 1, the spring 20 has a spring rate sufficiently high to permit a total functional deflection in the order of 10 mils. Consequently, while bearing pad 12 is supported by a relatively thick gas film, the bearing pad 18 is still in engagement with the abrasive recording surface 16. Thus, pad 18 is lapped such that its surface becomes parallel with surface 16 at zero film thickness. The spring rate is designed so that there is zero load force exerted by the pad 18 against the recording surface at some point before the complete head gap is worn away. Sometime before the condition of zero spring load occurs, the second slider bearing pad 18 is in condition to become supported by an extremely thin film of gas.

The foregoing discussion of the spring's load force can be better appreciated by referring to FIG. 2 of the drawings which schematically shows a magnetic head core 22 constituting a major portion, if not all, of the slider bearing pad 18 of FIG. 1. Core 22 is positioned adjacent an abrasive-containing recording surface which moves in the direction indicated by the arrow. The head core 22 is urged into engagement with the recording surface by spring N which finds its equivalent in spring 20 of FIG. 1, the spring being supported as generally indicated at 24. The spring's load force P is also diagrammatically illustrated. The spring rate of spring N is selected to result in a deflection to load point substantially less than the head core gap *d*. The rubbing of core 22 on the abrasive recording surface 16 wears away the bottom surface of core 22 causing spring N to extend and thereby reducing the load P. The load diminishes until load force P reaches zero. This occurs before the head core gap *d* is worn through. Before this point is reached the gas film can begin to sustain the head core 22 in non-contacting relationship with the recording medium.

The foregoing description of the utility of an abrasive recording surface has been directed toward the self-adjusting aspect of the invention for conditioning the slider bearing pad 18 to initially "fly." However, the arrangement also serves as a cleaning device should, for some reason, bearing pad 18 come into contact with the record in such a manner as to cause magnetic oxide or environmental dirt to adhere to the bearing pad. Absent a cleaning arrangement such accumulation could change the shape of the pad to an extent that the function of the gas film would be destroyed causing the pad to make permanent contact with the recording surface and ultimately destroying the record or the head. However, such a catastrophe is averted by the abrasive action of the recording surface which wears away or removes any material which might be transferred to the slider bearing pad.

The above described embodiment is illustrative of a preferred embodiment of the invention but is not intended to limit the possibilities of insuring the features being able to use high recording densities while maintaining quality reading and writing of information. For example, although only a single head core is described, it is apparent that the head assembly could equally well be designed so as to include a number of cores. The assembly design herein disclosed is an example of an arrangement in which the inventive features of this disclosure may be utilized, and it will become apparent to one skilled in the art that certain modifications may be made within the spirit of the invention as defined by the appended claims.

What is claimed is:

1. A magnetic recording arrangement utilizing a gas film to position a head core in spaced relationship from a recording medium when there is relative movement therebetween, comprising:

a. a single first slider bearing pad (12) pivotally mounted on a support element (10) about an axis normal to the direction of movement of the recording medium (16) with respect to said first pad, said pad being separated from the recording medium, during relative movement between the pad and the recording medium, by a distance sufficient to cause a load-supporting film therebetween;

b. a cantilevered spring (20) joined at one of its ends to said first bearing pad; and c. a second slider bearing pad (18) incorporating said head core, the second slider bearing pad being rigidly and non-pivotally mounted at the other end of said spring and being gas film supported at a distance from said recording medium which is less than the distance between the recording medium and said first bearing pad.

2. A magnetic recording arrangement as set forth in claim 1 wherein the spring is rigidly and non-pivotally joined to said first bearing pad.

3. A magnetic recording arrangement as set forth in claim 1, wherein said spring is of the cantilevered type and is oriented such that the movement of the recording medium is in a direction from the free end of the spring, which is connected to said second bearing pad, toward the spring end which is joined to said first bearing pad.

4. A magnetic recording arrangement as set forth in claim 3, wherein said first slider bearing pad includes an extending portion above the plane of the large bottom surface of the pad and said spring is attached to the extending portion directly above the point on the recording medium where an imaginary extension of the bottom surface of the first slider bearing pad would intersect said medium.

5. A magnetic recording arrangement as set forth in claim 1, wherein said recording medium includes a magnetic oxide surface containing an abrasive.

6. A magnetic recording arrangement as set forth in claim 5, wherein said head core includes a head gap and the spring has a spring rate which, during wearing of the second bearing pad, reduces the load force applied by the spring to the second pad to zero before the core is worn through.

* * * * *

UNITED STATES PATENT OFFICE
CERTIFICATE OF CORRECTION

Patent No. 3,720,932 Dated March 13, 1973

Inventor(s) Robert L. Perkins and Beat G. Keel

It is certified that error appears in the above-identified patent and that said Letters Patent are hereby corrected as shown below:

On the title page, after the inventor information, please read:

--Assignee: Control Data Corporation, Minneapolis, Minn. --

Signed and sealed this 10th day of July 1973.

(SEAL)
Attest:

EDWARD M.FLETCHER,JR.
Attesting Officer

Rene Tegtmeyer
Acting Commissioner of Patents